C. C. SAVERY.
Filters.

No. 133,953. Patented Dec. 17, 1872.

Witnesses. Thomas McIlvain
Harry Smith

C. C. Savery
By his attys.
Howson and Son

UNITED STATES PATENT OFFICE.

CHARLES C. SAVERY, OF PHILADELPHIA, PENNSYLVANIA.

IMPROVEMENT IN FILTERS.

Specification forming part of Letters Patent No. 133,953, dated December 17, 1872.

*To all whom it may concern:*

Figure 1:
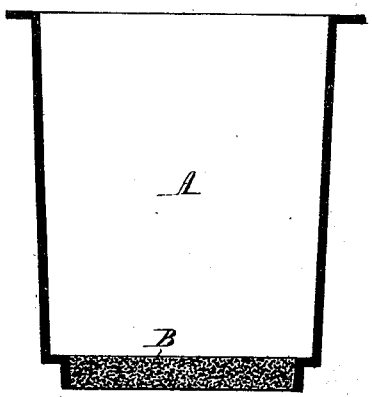
Figure 2:
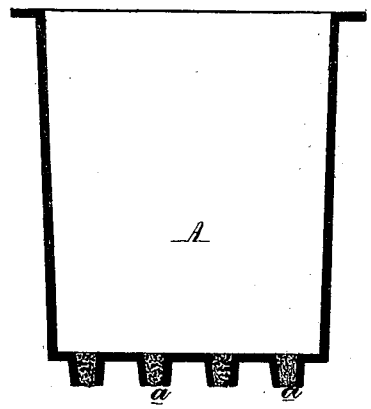

Be it known that I, CHARLES C. SAVERY, of the city and county of Philadelphia, State of Pennsylvania, have invented certain Improvements in Filters, of which the following is a specification:

The object of my invention is a permanent and cleanly filter, which I obtain by permanently fitting into the bottom of a suitable vessel, A, Figure 1, a slab, B, of solid filtering material or composition, or by packing similar material into a number of holes in the bottom of the vessel, as shown in Fig. 2, the vessel consisting by preference of enameled cast-iron. It may, however, be made of earthenware and other material.

Although a solid slab, B, of the filtering material, adapted to an opening in the bottom of the vessel A, as shown in Fig. 1, may be adopted in vessels of comparatively small dimensions, a much more substantial filter can be made by casting on the bottom of the vessel a number of tubular projections, a, Fig. 2, into each of which is fitted or packed the solid filtering material.

It is not essential, however, that the openings for the material should be circular, for they may be of any other shape which circumstances (such as the form of the vessel and the strength which it is desirable to impart to the same) may suggest.

I discard sponge, felt, charcoal, and other like filtering mediums, which soon become impregnated with foul matter and require repeated cleansing, and employ a solid and permanent material, which has little liability to become foul, as filtration takes place at the surface.

Figure 3:

Such filtering material has been heretofore composed of sand and clay intimately mixed and properly baked. If desired, this composition may be packed, while in a plastic state, in the opening or openings at the bottom of the vessel, as in Fig. 3 for instance, and afterward baked in its place.

I prefer, however, to carry out my invention in connection with a vessel of enameled cast-iron, having a number of openings in the bottom; and after the vessel has been enameled to pack into these openings said ground flint, mixed with the same material of which the enamel is composed, or with any suitable flux, so that on subjecting the bottom of the vessel to heat there will be a porous vitrified mass in each opening, and this mass will be permanently united to the enamel of the vessel; or, in other words, the filtering material becomes a component part of the vessel.

The filtration, as before remarked, takes place at the surface of the material, no foul matter penetrating it to any serious extent, as in sponges, felt, &c.; hence the simple occasional rinsing of the vessel will maintain the same in a cleanly condition.

Figure 4:
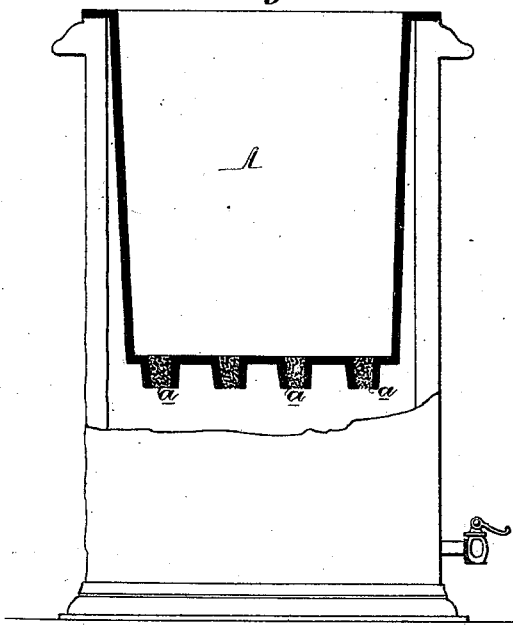
Figure 5:
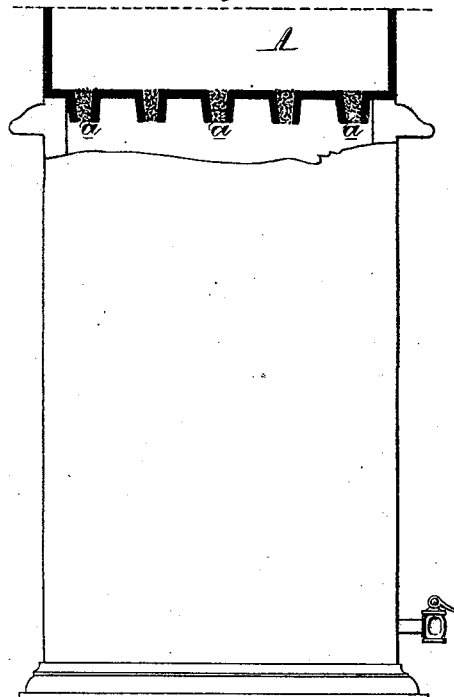

Figs. 4 and 5 so clearly illustrate the application of my invention to water-coolers that an explanation of these figures will be unnecessary.

I claim as my invention—

1. An enamel-lined filter, to which the filtering material is secured by vitrification, as set forth.

2. The within-described vessel, having at the base a number of openings packed with filtering material, as specified.

In testimony whereof I have signed my name to this specification in the presence of two subscribing witnesses.

CHARLES C. SAVERY.

Witnesses:
WM. A. STEEL,
HARRY W. DOUTY.